No. 660,901. Patented Oct. 30, 1900.
T. J. JENKINS.
CANDY MACHINE.
(Application filed Mar. 3, 1900.)
(No Model.) 3 Sheets—Sheet 1.

WITNESSES:

INVENTOR

BY

ATTORNEYS

No. 660,901. Patented Oct. 30, 1900.
T. J. JENKINS.
CANDY MACHINE.
(Application filed Mar. 3, 1900.)
(No Model.) 3 Sheets—Sheet 2.
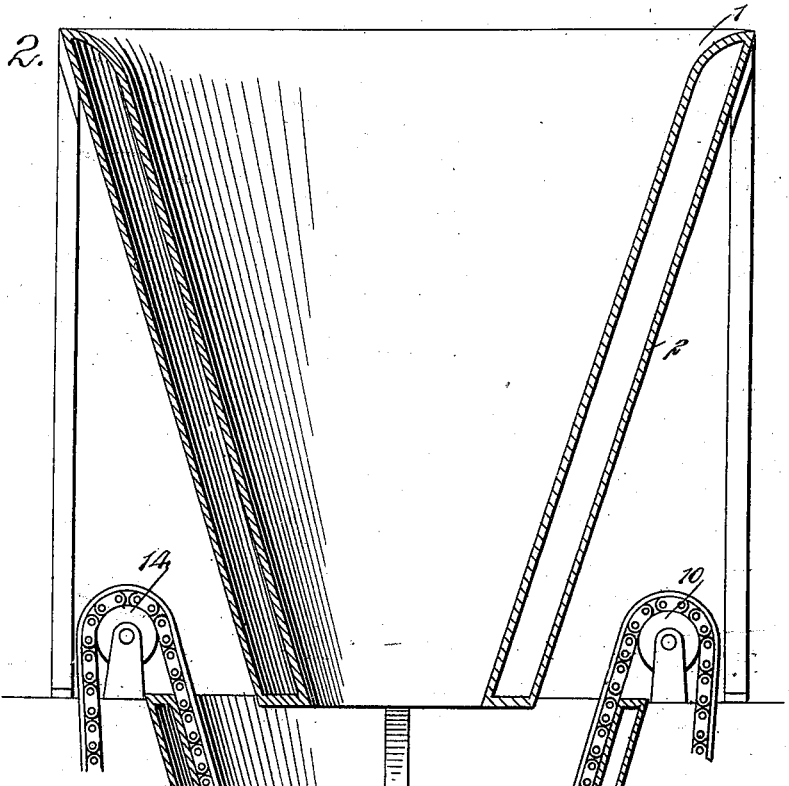
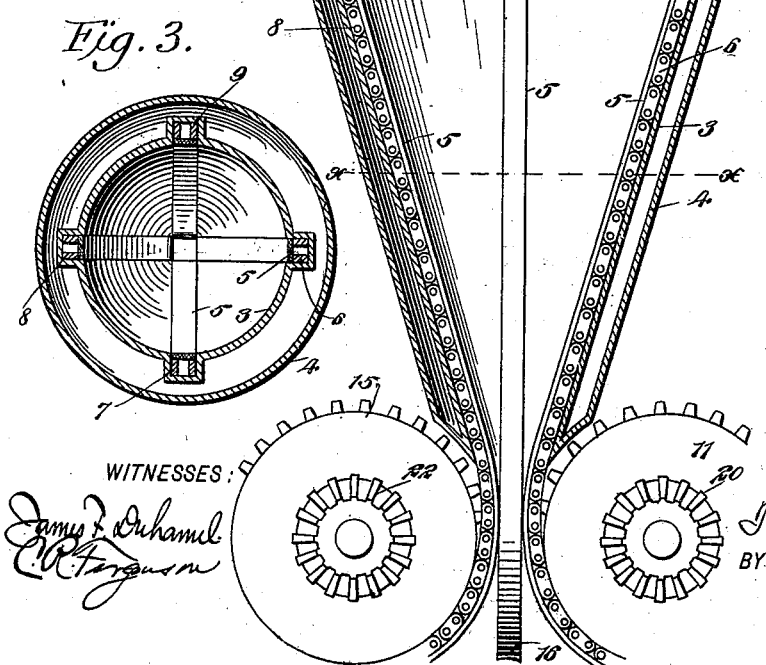
WITNESSES:
INVENTOR
BY
ATTORNEYS
THE NORRIS PETERS CO., PHOTO-LITHO., WASHINGTON, D. C.

No. 660,901. Patented Oct. 30, 1900.
T. J. JENKINS.
CANDY MACHINE.
(Application filed Mar. 3, 1900.)
(No Model.) 3 Sheets—Sheet 3.

WITNESSES:
James F. Duhamel
C. R. Ferguson

INVENTOR
T. J. Jenkins
BY
ATTORNEYS

UNITED STATES PATENT OFFICE.

THOMAS JOHN JENKINS, OF INDIANAPOLIS, INDIANA.

CANDY-MACHINE.

SPECIFICATION forming part of Letters Patent No. 660,901, dated October 30, 1900.

Application filed March 3, 1900. Serial No. 7,209. (No model.)

*To all whom it may concern:*

Be it known that I, THOMAS JOHN JENKINS, a citizen of the United States, and a resident of Indianapolis, in the county of Marion and State of Indiana, have invented certain new and useful Improvements in Candy-Machines, of which the following is a full, clear, and exact description.

This invention relates to improvements in machines for making and forming stick-candy; and the object is to provide a machine by means of which the candy batch may be rapidly spun out, twisted, cut into proper lengths, and cooled.

I will describe a candy-machine embodying my invention and then point out the novel features in the appended claims.

Reference is to be had to the accompanying drawings, forming a part of this specification, in which similar characters of reference indicate corresponding parts in all the figures.

Figure 1:
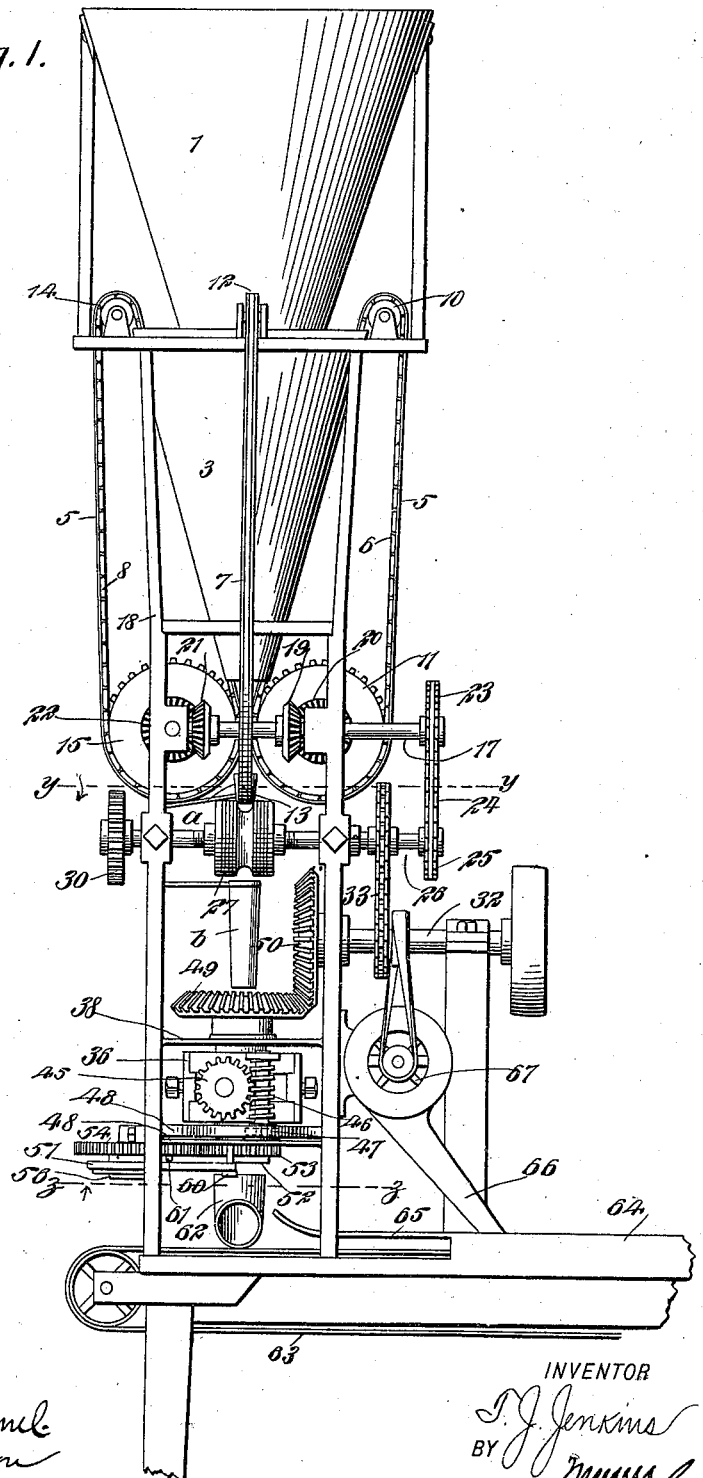
Figure 4:
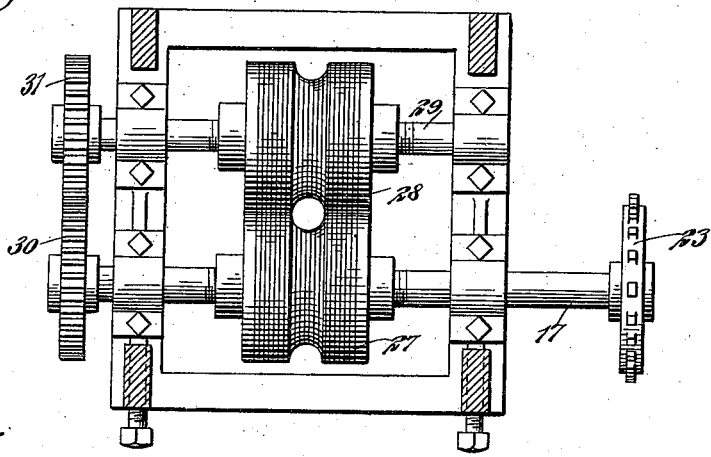
Figure 5:
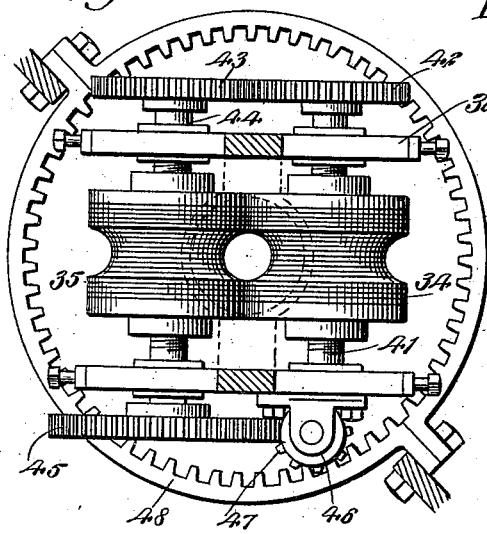
Figure 6:
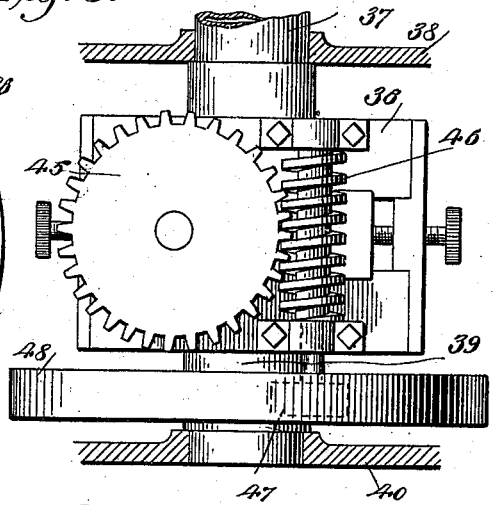
Figure 7:
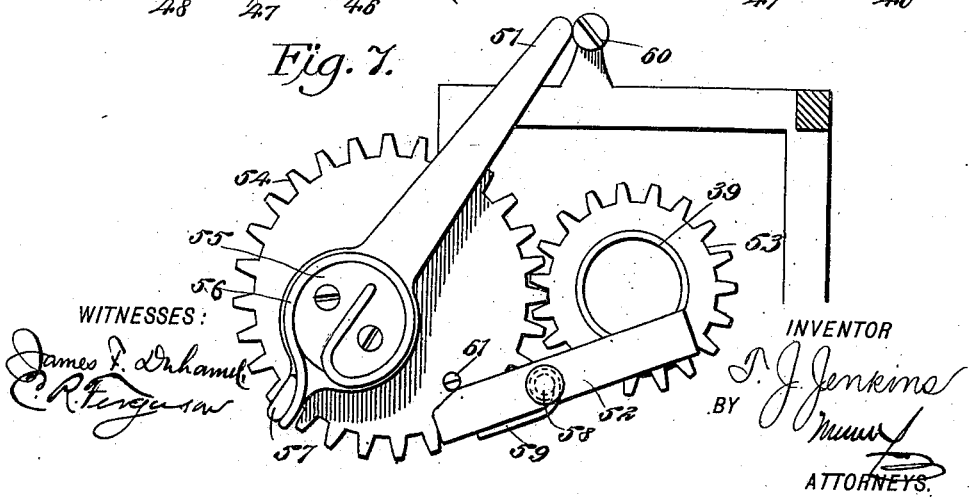

Figure 1 is an elevation of a candy-machine embodying my invention. Fig. 2 is a sectional elevation of a portion thereof. Fig. 3 is a section on the line *x x* of Fig. 2. Fig. 4 is a section on the line *y y* of Fig. 1. Fig. 5 is a plan view of a twisting device employed. Fig. 6 is a side view thereof, and Fig. 7 is a section on the line *z z* of Fig. 1.

Referring to the drawings, 1 designates a batch-hopper which is funnel-shaped and is provided with a jacket 2, the space between the jacket and the inner wall being designed to contain a cooling or a heating medium, as occasion may require. Arranged below the batch-hopper, so as to receive material therefrom, is a funnel-shaped feed-hopper 3, having a jacket 4, providing a space to hold a heating or cooling medium. The lower or outlet end of this hopper 3 is substantially the size of the stick of candy to be formed, and movable in the hopper is a feeder and sizer, consisting, as here shown, of a plurality of endless belts 5, preferably of leather or similar material, the said belts being mounted on sprocket-chains 6 7 8 9.

The interior of the hopper is provided with channels to receive said chains and belts, so that the surfaces of the belts will be substantially on a plane with the interior of the hopper. The chain 6 runs over a pulley 10, arranged at the upper portion of the hopper, and thence around a sprocket-wheel 11, arranged at the lower portion of the hopper. The chain 7 runs over a roller 12 at the upper portion of the hopper and thence around a sprocket-wheel 13 at the lower portion of the hopper. The chain 8 passes over a roller 14 at the upper portion of the hopper and thence around a sprocket-wheel 15 at the lower portion of the hopper, while the chain 9 passes around a similar roller at the upper portion of the hopper and around a sprocket-wheel 16 at the lower portion of the hopper.

The sprocket-wheel 13 is mounted on a shaft 17, which has its bearings in boxes secured to the frame 18 of the machine, and on this shaft 17 is a bevel-pinion 19, meshing with a bevel-pinion 20 on the shaft of the wheel 11. Also on the shaft 17 is a bevel-pinion 21, engaging with a bevel-pinion 22 on the shaft of the wheel 15. Either one of the wheels 11 and 15 may have a driving connection with the wheel 16. By this arrangement of gearing it is obvious that all the feeders and sizers may be operated in unison.

On the shaft 17 is a sprocket-wheel 23, from which a chain 24 extends to a sprocket-wheel 25 on a shaft 26. Attached to the shaft 26 is a roller 27, coacting with a roller 28 on a shaft 29. The rollers 27 and 28 are rotated together by means of gear-wheels 30 31 on the shafts 26 and 29. These rollers 27 and 28 are what I term "shaping" rollers, as they properly shape the candy material as it is discharged to them from the feed-hopper. The rollers will either be covered with leather or similar material or they may be formed of several disks of leather placed together and suitably secured on the shafts by metal washers. The central portions of the rollers will be provided with annular grooves of the desired shape in cross-section. As here shown, the rollers will form a round stick. It is designed that the gearing for the rollers 27 and 28 shall be so proportioned as related to the gearing for the feeder and sizer belts that the said rollers shall have a faster motion than the feeder and sizer, so that the stick will be smoothed as it is drawn out from the feeder. The shaft 26 is operated from a main driving-shaft 32, which will be driven by any suitable motor. As here shown, the shafts 26 and 32 have a band connection 33.

Arranged below the shaping-rollers is a twisting device consisting of rollers 34 35, which are formed similar to the rollers 27 and 28. The rollers have their bearings in boxes adjustably arranged in a frame 36, the upper portion of which has a tubular journal 37, having a bearing in a plate 38, arranged in the frame, and the lower portion of said frame has a tubular journal 39, which has its bearing in a plate 40, secured in the frame. These tubular bearings 37 and 39 are of course in alinement with the twisting-rollers, and the upper tubular bearing receives the candy from the shaping-rollers, while the lower tubular bearing receives the candy from the twisting-rollers. The shaft 41 of the roller 34 has a gear-wheel 42 meshing with a gear-wheel 43 on the shaft 44 of the roller 35, and on the opposite end of this shaft 44 is a worm-wheel 45, engaging with a worm 46, supported by the frame 36, and on the lower end of the worm 46 is a pinion 47, which engages with a fixed circular rack 48.

On the upper end of the tubular journal 37 is a miter-gear 49, engaging with a miter-gear 50 on the main driving-shaft 32, so that as said shaft revolves the frame carrying the twisting-rollers will be revolved, and during this movement the pinion 47, engaging with the rack 48, will rotate the worm 46, and consequently the rollers 34 and 35. The axial rotation of the rollers 34 and 35 will cause a downward feed of the candy stick, while the circular movement thereof will cause the twisting of the stick, thus making spirally-disposed stripes in the stick.

After passing through the twisting-rollers the candy is to be cut in sticks of the desired length. As a means therefor I provide cutting-blades 51 and 52, designed at a certain time to move over the lower end of the tubular journal 39. To the lower end of this tubular journal 39 is attached a pinion 53, which meshes with a gear-wheel 54, arranged on the lower side of the plate 40. The cutter 51 is loosely mounted on a hub 55, arranged eccentrically on the wheel 54, and an actuating-spring 56 is attached at one end to said hub and at the other end engages with a lug 57 on an extension of the cutter 51. The cutter 52 is mounted to rotate on a fixed stud 58 and is moved toward its cutting position by a spring 59. The operation of this part of the device is as follows: As the pinion 53 rotates the gear 54 will be rotated therefrom, actuating the cutter 51. When the end of the cutter 51 reaches a stop or fixed pin 60, it will be held against the resistance of the spring 56 until by the eccentric movement the end of said cutter is freed from the stop. Then the spring 56 will cause the cutter to move on the hub 55 and pass over the lower end of the tube 39. When the cutter 51 engages with the stop 60, a pin 61 on the wheel 54 will engage with the cutter 52, moving it against the resistance of its spring. When said pin 61 passes off the end of the cutter 52, the spring will cause it to move across the lower end of the tube 39, and thus the two cutters 51 and 52 will sever the stick. The severed stick will fall into a chute 62 and from there pass to an endless conveying-belt 63, the upper stretch of which moves through a cooler-casing 64. The upper wall 65 of this cooler-casing is at a proper distance above the belt to cause a frictional engagement of the candy stick upon said belt and upper wall, so that as the stick is carried along by the belt it will be rotated in order that it may be thoroughly cooled by a blast of air forced through a pipe 66, leading into the cooler 64. The air-blast is forced through the pipe 66 by a fan 67, operated by belt connection from the driving-shaft 32.

In operation the candy batch is placed in the hopper 1, from which it passes into the hopper 3. Owing to the convergence downward of the feed-belts and as they meet at the edges at the bottom, the candy material will be stretched or drawn out at the bottom faster than it will be drawn downward at the upper portion. The material formed by the feeder and sizer will pass to the shaping-rollers between guide-plates $a$ and from these rollers through a guide $b$ to the twisting-rollers, the operation of which has been described, as has also the operating of the cutting device which receives the material from the twister.

It is to be understood that there may be a greater or less number of feeding-belts arranged in the hopper 3, depending somewhat on the desired shape of the stick, and also that grooves on the shaping-rollers and twisting-rollers may be formed to make a round stick, an angular stick, or any other desired shape. It is also to be understood that the hopper 1 may be dispensed with and the material placed directly in the hopper 3. I prefer, however, to employ the hopper 1, as described.

Having thus described my invention, I claim as new and desire to secure by Letters Patent—

1. In a candy-machine, a feed-hopper, a feeder and sizer device for operating in said hopper, a forming device arranged below the hopper, and a twisting device arranged below the forming device, substantially as specified.

2. In a candy-machine, a feed-hopper, endless feeding-belts for operating in said hopper, forming-rollers for receiving the material from the feeding-belts, and twisting-rollers receiving material from the forming-rollers, substantially as specified.

3. In a candy-machine, a funnel-shaped feeding-hopper, a plurality of feeding-belts movable therein, the said belts meeting at the lower end of the hopper, forming-rollers for receiving material from the belts, twisting-rollers for receiving material from the forming-rollers, and a cutting device below the twisting-rollers, substantially as specified.

4. In a candy-machine, the combination with feeding and forming devices, of a twister, comprising rollers geared together, a frame in which the rollers are mounted, means for rotating said frame in a horizontal plane, a worm carried by the frame, a gear-wheel on the shaft of one of the rollers, engaging with said worm, a pinion on the worm, and a fixed rack with which said pinion engages, substantially as specified.

5. In a candy-machine, a funnel-shaped feed-hopper having channels in its inner side, endless chains movable in said channels, leather facings or belts on said chains, and means for causing movements of the chains, substantially as specified.

6. In a candy-machine, the combination with forming devices, of a cutter, comprising a blade, a gear-wheel on which the said cutter is eccentrically mounted, a spring for moving the cutter in one direction, a holding or stopping device for the cutter, another spring-pressed cutter, a pin on the gear-wheel for engaging with said other cutter, and a pinion engaging with the gear-wheel, the said pinion being operated by movements of the forming devices, substantially as specified.

7. In a candy-machine, a batch-hopper, a feed-hopper for receiving material from the batch-hopper, a feeder and sizer for operating in said feed-hopper, forming-rollers below the feed-hopper, twisting-rollers below the forming-rollers, and a driving-shaft from which all the movable devices are operated, substantially as specified.

8. In a candy-machine, a cooler-casing, an endless belt movable therein, the space between the upper wall of said casing and the belt being such as to cause frictional engagement between the stick, the belt and the upper wall, whereby the stick is rolled as it is carried along, and an air-blast device leading into the cooler, substantially as specified.

9. In a candy-machine, the combination with forming devices and a cutter, of a cooler-casing for receiving material directly from the cutter, means for cooling said casing, and a carrier movable in the casing, said carrier and a wall of the casing operating to impart a rotary motion to the candy while moving along, substantially as specified.

In testimony whereof I have signed my name to this specification, in the presence of two subscribing witnesses, this 26th day of February, 1900.

THOMAS JOHN JENKINS.

Witnesses:
WILLIAM JENKINS,
EDWARD HANEL.